(12) United States Patent
Morishita et al.

(10) Patent No.: US 6,713,211 B2
(45) Date of Patent: Mar. 30, 2004

(54) SQUARE SHAPED BATTERY

(75) Inventors: Nobuyasu Morishita, Toyohashi (JP);
Shinichi Yuasa, Kyotanabe (JP);
Akihiro Taniguchi, Toyohashi (JP);
Munehisa Ikoma, Toyohashi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 277 days.

(21) Appl. No.: 09/815,684

(22) Filed: Mar. 23, 2001

(65) Prior Publication Data
US 2001/0051296 A1 Dec. 13, 2001

(30) Foreign Application Priority Data
Mar. 24, 2000 (JP) ........................ 2000-085308

(51) Int. Cl.[7] .................. H01M 4/00; H01M 6/10
(52) U.S. Cl. ................ 429/94; 429/131; 429/136; 429/139; 429/211
(58) Field of Search ............... 429/94, 211, 136, 429/137; 29/623.1, 623.3, 131, 139

(56) References Cited

U.S. PATENT DOCUMENTS 6,040,086 A * 3/2000 Yoshida et al. .............. 429/211
6,440,604 B1 * 8/2002 Inoue et al. ................. 429/211

* cited by examiner

Primary Examiner—Patrick Ryan
Assistant Examiner—Julian Mercado
(74) Attorney, Agent, or Firm—Snell & Wilmer, LLP

(57) ABSTRACT

A square shaped battery includes: an electrode plate group including a belt-like positive electrode plate, a belt-like negative electrode plate, and a belt-like separator, the belt-like positive electrode plate, the belt-like negative electrode plate, and the belt-like separator being laminated and rolled up to form the electrode plate group; and a pair of power collectors disposed on sides of the electrode plate group for collecting electric power from the electrode plate group.

8 Claims, 5 Drawing Sheets

PRIOR ART

SQUARE SHAPED BATTERY

BACKGROUND OF THE INVENTION

1. Field of the Invention

The present invention relates to a square shaped battery, and specifically to a square shaped battery including an electrode plate group formed by rolling a belt-like positive electrode plate, a belt-like negative electrode plate, and a belt-like separator.

2. Description of the Related Art

In the case where a battery case is made of resin, electrode plates are laminated, and leads connected to end portions of respective electrode plates are gathered.

In the case where a battery case is made of metal, a portion of a belt-like positive electrode plate and a sealing plate are both welded to a lead where the lead is connected between the portion of the belt-like positive electrode plate and the sealing plate, and a negative electrode plate is connected to the metal battery case through a lead or contacted directly with the metal battery for collecting electric power.

A conventional square shaped battery 900 is now described with reference to FIG. 9.

The square shaped battery 900 includes positive electrode plates 1 and negative electrode plates 2. Each of the positive electrode plates 1 is formed of foamed nickel so as to have an unfilled portion having a 5 mm width at an end thereof. The unfilled portion is filled with a positive electrode material mainly composed of nickel hydroxide. A nickel lead is attached to the portion filled with the positive electrode material. The capacity of the positive electrode plate 1 is about 1 Ah (Ampere hour). Each negative electrode plate 2 is formed by punched metal which is coated with a negative electrode material mainly composed of hydrogen occlusion alloy so as to leave an uncoated portion having a 5 mm width at an end thereof. The capacity of the negative electrode plate 2 is about 1.25 Ah.

The positive electrode plates 1 are each covered with a sack-like separator 3 formed of nonwoven polypropylene fabric. Seven positive electrode plates 1 and eight negative electrode plates 2 are alternately superposed thus forming an electrode plate group. Nickel leads 4 are provided to the electrode plates 1 and 2. The nickel leads 4 are gathered at an upper end of the electrode plate group, and connected to external positive and negative terminals by resistance-welding. A resin case is used as a battery case for containing the square shaped battery 900. The battery case containing the square shaped battery 900 is filled with electrolyte mainly composed of potassium hydroxide, and then, the square shaped battery 900 is charged and discharged at 0.1 C (Capacity) for activation. The capacity of the square shaped battery 900 is about 7 Ah.

Another conventional square shaped battery 1000 is now described with reference to FIG. 10.

The square shaped battery 1000 includes a belt-like positive electrode plate 5 and a belt-like negative electrode plate 6. The positive electrode plate 5 is formed of foamed nickel so as to have an unfilled portion of 5 mm×5 mm at an end thereof. The unfilled portion is filled with a positive electrode material mainly composed of nickel hydroxide. A nickel lead is attached to the portion filled with the positive electrode material. The capacity of the positive electrode plate 5 is about 7 Ah. The negative electrode plate 6 is formed by punched metal which is coated with a negative electrode material mainly composed of hydrogen occlusion alloy so as to leave an uncoated portion of 5 mm×5 mm at an end thereof. The capacity of the negative electrode plate 6 is about 10 Ah.

A separator 7 made of nonwoven polypropylene fabric is interposed between the positive electrode plate 5 and the negative electrode plate 6, and a laminate of the positive electrode plate 5, the separator 7, and the negative electrode plate 6 is rolled to form an electrode plate group. For the purpose of connection with an external terminal (i.e., for the purpose of collecting electric power), a nickel lead 8 provided to the positive electrode plate 5 is welded to a sealing plate, and a negative electrode is connected to a battery case. The battery case is made of a metal. The battery case containing the square shaped battery 1000 is filled with electrolyte mainly composed of potassium hydroxide, and then, the square shaped battery 1000 is charged and discharged at 0.1 C for activation. The capacity of the square shaped battery 1000 is about 7 Ah.

In the case of a high power battery for use in hybrid energy vehicles (HEVs), etc., the electrochemical reaction resistance is reduced by increasing the area of the electrodes, whereby the power of the battery is increased. However, in the case where electric power is not sufficiently collected from an electrode plate group, desired high power cannot be obtained even if the electrochemical reaction resistance is reduced. Furthermore, when plate-shape electrodes are used, a large number of electrodes are required, and accordingly, the number of production steps increase.

SUMMARY OF THE INVENTION

According to one embodiment of the present invention, a square shaped battery includes: an electrode plate group including a belt-like positive electrode plate, a belt-like negative electrode plate, and a belt-like separator, the belt-like positive electrode plate, the belt-like negative electrode plate, and the belt-like separator being laminated and rolled up to form the electrode plate group; and a pair of power collectors disposed on sides of the electrode plate group for collecting electric power from the electrode plate group.

In one embodiment of the present invention, the pair of power collectors are welded to the sides of the electrode plate group.

In another embodiment of the present invention, a welding interval of each of the power collectors is narrower in an upper portion than in a lower portion.

In still another embodiment of the present invention, the pair of the power collectors have protrusions for obtaining a sufficient welding area through which the pair of the power collectors are welded to the electrode plate group.

In still another embodiment of the present invention, each of the protrusions has a hollow portion.

In still another embodiment of the present invention, each of the pair of the power collectors has a central portion in which a protrusion is not provided, and the central portion is pressed against the electrode plate group with the power collector being welded to the electrode plate group.

In still another embodiment of the present invention, the pair of power collectors are disposed on both sides of the electrode plate group such that a width direction of the electrode plate group is substantially perpendicular to faces of the pair of power collectors.

In still another embodiment of the present invention, one of the pair of power collectors collects electric power from the electrode plate group in a direction different from that of the other of the pair of power collectors.

In still another embodiment of the present invention, each of the pair of power collectors has a "U"-shape which binds the electrode plate group so as to suppress expansion of the sides of the electrode plate group.

According to one aspect of the present invention, belt-like electrode plates are rolled up to form an electrode plate group, and electric power is collected from the entire side faces of the rolled electrode plate group, whereby the resistance in power collectors can be reduced. With such a structure, increased electric power due to the increase in electrode plate area can be efficiently collected. Furthermore, the number of steps for forming the electrode plate group can be reduced.

According to another aspect of the present invention, the facing area of electrode plates (i.e., the surface area between adjacent plates) can be increased while reducing the number of electrode plates.

Thus, the invention described herein makes possible the advantages of (1) providing a high-power square shaped battery, (2) providing a square shaped battery in which electric power can be sufficiently collected, and (3) providing a square shaped battery in which an electrochemical reaction resistance can be reduced.

These and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described with reference to the drawings.

Embodiment 1

Figure 1A:
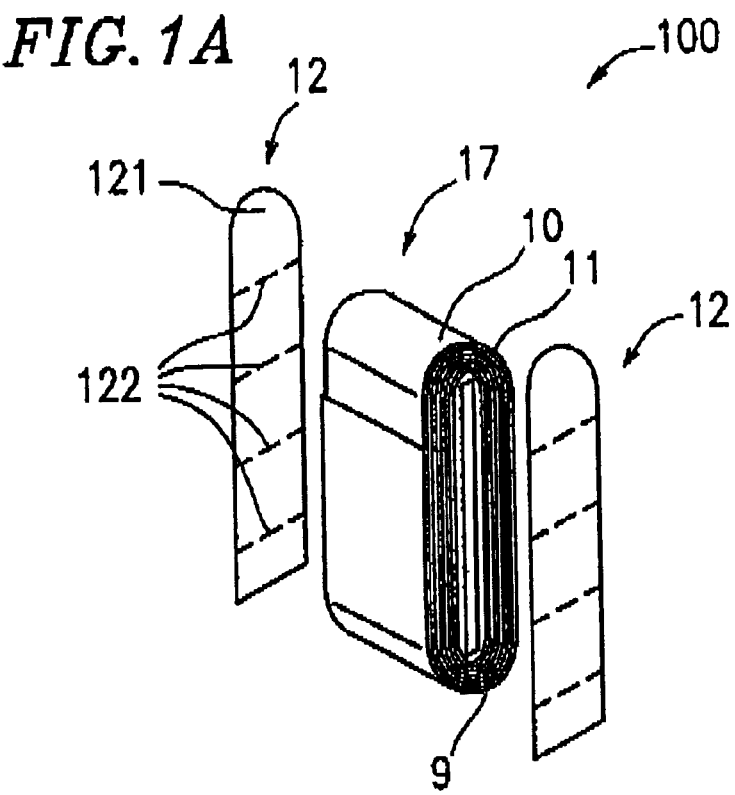
FIG. 1A is an exploded view of a square shaped battery 100 according to embodiment 1 of the present invention.
Figure 1B:
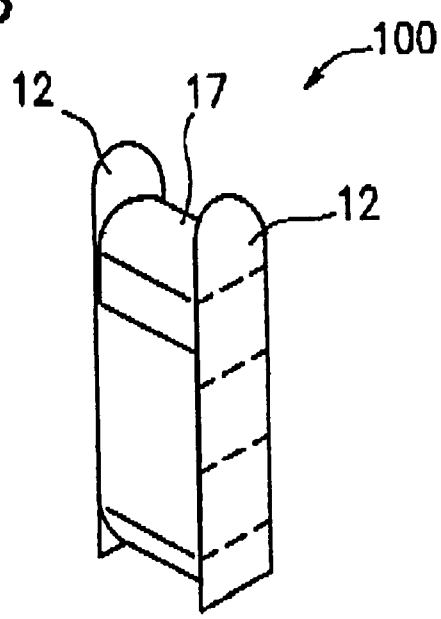
FIG. 1B shows an assembled structure of the square shaped battery 100 according to embodiment 1.

FIG. 1A is an exploded view of a square shaped battery 100 according to embodiment 1 of the present invention. FIG. 1B shows an assembled structure of the square shaped battery 100 according to embodiment 1.

As shown in FIGS. 1A and 1B, the square shaped battery 100 includes an electrode plate group 17 and a pair of power collectors 12 attached to both sides of the electrode plate group 17 for collecting electric power therefrom.

The electrode plate group 17 includes a belt-like positive electrode plate 9, a belt-like negative electrode plate 10, and a belt-like separator 11. The separator 11 is interposed between the positive electrode plate 9 and the negative electrode plate 10. The electrode plate group 17 in formed by rolling up the positive electrode plate 9, the negative electrode plate 10, and the separator 11 interposed therebetween.

The positive electrode plate 9 is formed of foamed nickel so as to have an unfilled portion having a 2 mm width at an end thereof. The unfilled portion is filled with a positive electrode material mainly composed of nickel hydroxide. A nickel lead is attached to the portion filled with the positive electrode material. The capacity of the positive electrode plate 9 is about 7 Ah.

The negative electrode plate 10 is formed by punched metal which is coated with a negative electrode material mainly composed of hydrogen occlusion alloy so as to leave an uncoated portion having a 2 mm width at an end thereof. The capacity of the negative electrode plate 10 is about 10 Ah. The separator 11 is formed by nonwoven polypropylene fabric.

The pair of power collectors 12 are provided on the both sides of the electrode plate group 17 such that the width direction of the electrode plate group 17 is perpendicular to faces of the pair of power collectors 12. The pair of power collectors 12 are connected to both sides of the electrode plate group 17 by a laser weld at 20 mm intervals. The electrode plate group 17 is connected to external positive and negative terminals (not shown) through the pair of power collectors 12.

The pair of power collectors 12 are connected to the external positive and negative terminals at upper end portions 121 by resistance-welding. Nickel wax having a low melting temperature is applied to welding portions 122 of the pair of power collectors 12.

A case (not shown) for containing the square shaped battery 100 is made of resin. The case containing the square shaped battery 100 is filled with electrolyte, and the square shaped battery 100 is charged and discharged at 0.1 C. for activation. The capacity of the square shaped battery 100 is about 7 Ah.

The pair of power collectors 12, which are provided on both sides of the electrode plate group 17 for collecting electric power from the electrode plate group 17, results in the electrode plate group 17 being able to output high power.

Embodiment 2

Figure 2:
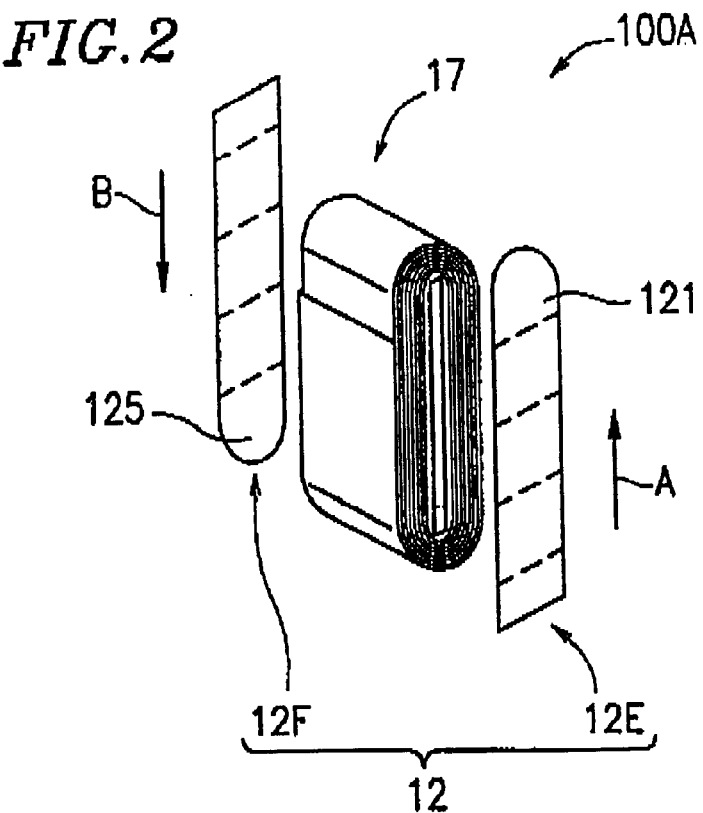
FIG. 2 is an exploded view of a square shaped battery 100A according to embodiment 2 of the present invention.

FIG. 2 is an exploded view of a square shaped battery 100A according to embodiment 2 of the present invention. In FIG. 2, like elements are indicated by like reference numerals used for the square shaped battery 100 of FIGS. 1A and 1B, and detailed descriptions thereof are omitted.

A pair of power collectors 12 include a power collector 12E and a power collector 12F. The power collector 12E is connected to an external positive terminal at an upper end 121 thereof by resistance-welding. The power collector 12F is connected to an external negative terminal at a lower end 125 thereof by resistance-welding.

In the square shaped battery 100A according to embodiment 2, the pair of power collectors 12 collect electric power in opposite directions (directions represented by arrows A and B), i.e., an electric current taken out from the electrode plate group 17 by the power collector 12E flows in the power collector 12E in a direction indicated by arrow A, and an electric current taken out from the electrode plate group 17 by the power collector 12F flows in the power collector 12F in a direction indicated by arrow B.

Since the pair of power collectors 12 collect electric power in opposite directions, electric currents flow smoothly from the electrode plate group 17.

Embodiment 3

Figure 3:
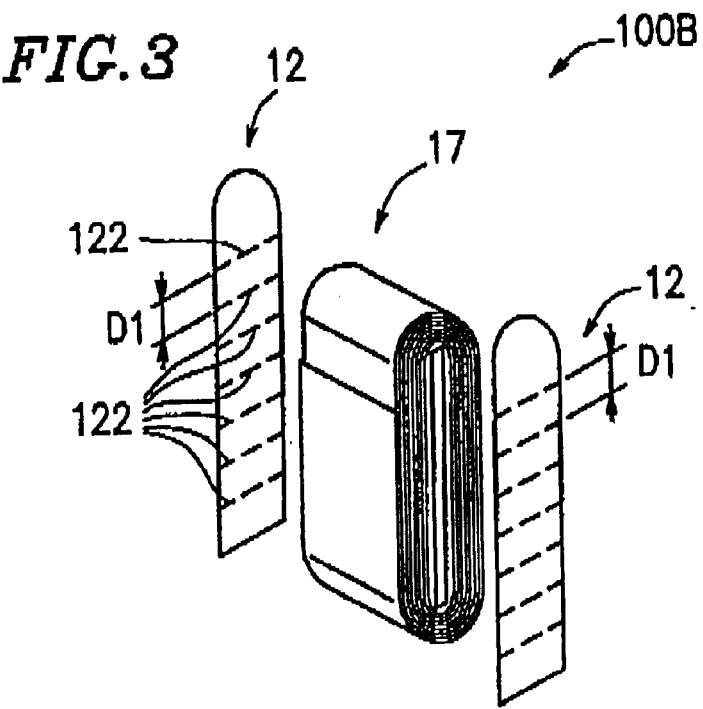
FIG. 3 is an exploded view of a square shaped battery 100B according to embodiment 3 of the present invention.

FIG. 3 is an exploded view of a square shaped battery 100B according to embodiment 3 of the present invention. In FIG. 3, like elements are indicated by like reference numerals used for the square shaped battery 100 of FIGS. 1A and 1B, and detailed descriptions thereof are omitted.

In the square shaped battery 100B according to embodiment 3, the pair of power collectors 12 are connected to both sides of the electrode plate group 17 by a laser weld at intervals of D1 (=10 mm). By increasing the number of power collection points (welding portions 122), power collection efficiency further increases.

Embodiment 4

Figure 4:
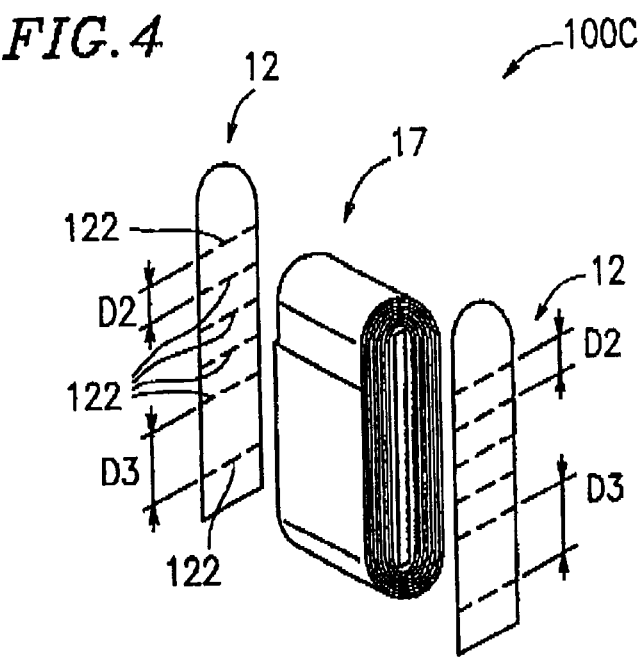
FIG. 4 is an exploded view of a square shaped battery 100C according to embodiment 4 of the present invention.

FIG. 4 is an exploded view of a square shaped battery 100C according to embodiment 4 of the present invention. In FIG. 4, like elements are indicated by like reference numerals used for the square shaped battery 100 of FIGS. 1A and 1B, and detailed descriptions thereof are omitted.

In the square shaped battery 100C according to embodiment 4, for each of the pair of power collectors 12, a welding interval D2 in an upper portion is narrower than a welding interval D3 in a lower portion.

The upper portion of the power collector 12 is connected to a side of the electrode plate group 17 by a laser weld at intervals of D2=10 mm. The lower portion of the power collector 12 is connected to a side of the electrode plate group 17 by a laser weld at intervals of D3=20 mm.

A welding point (welding portion 122) in the lower portion of the electrode plate group 17 does not greatly contribute to power collection. Accordingly, it is preferable that welding points are concentrated in the upper portion of the power collector 12.

Embodiment 5

Figure 5:
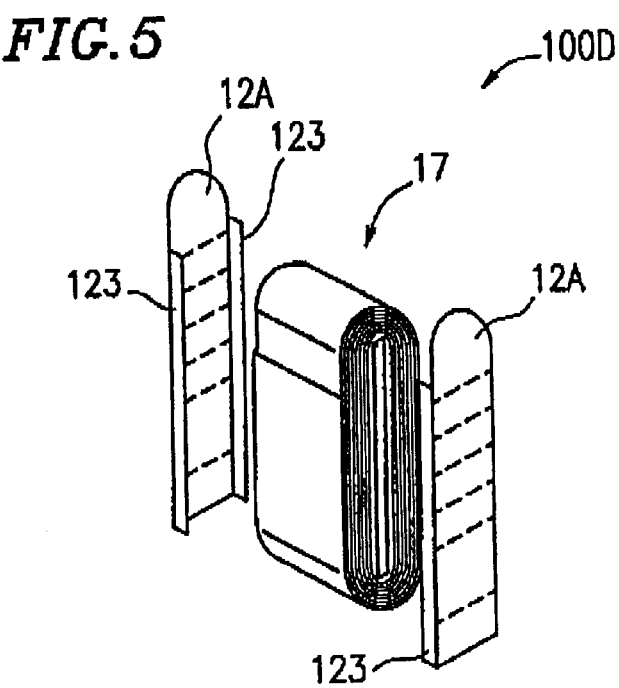
FIG. 5 is an exploded view of a square shaped battery 100D according to embodiment 5 of the present invention.

FIG. 5 is an exploded view of a square shaped battery 100D according to embodiment 5 of the present invention. In FIG. 5, like elements are indicated by like reference numerals used for the square shaped battery 100C of FIG. 4, and detailed descriptions thereof are omitted.

In the square shaped battery 100D according to embodiment 5, a pair of power collectors 12A each have bent portions 123. The bent portions 123 suppress expansion of the sides of the electrode plate group 17. As shown in FIG. 5, each of the pair of power collectors 12A has a "U"-shape so as to bind the electrode plate group 17.

Since each of the pair of power collectors 12A has bent portions 123, i.e., each of the pair of power collectors 12A has a "U"-shape which binds the electrode plate group 17, expansion of the sides of the electrode plate group 17 can be suppressed. With such a structure, reliability of power collection is improved.

Embodiment 6

Figure 6:
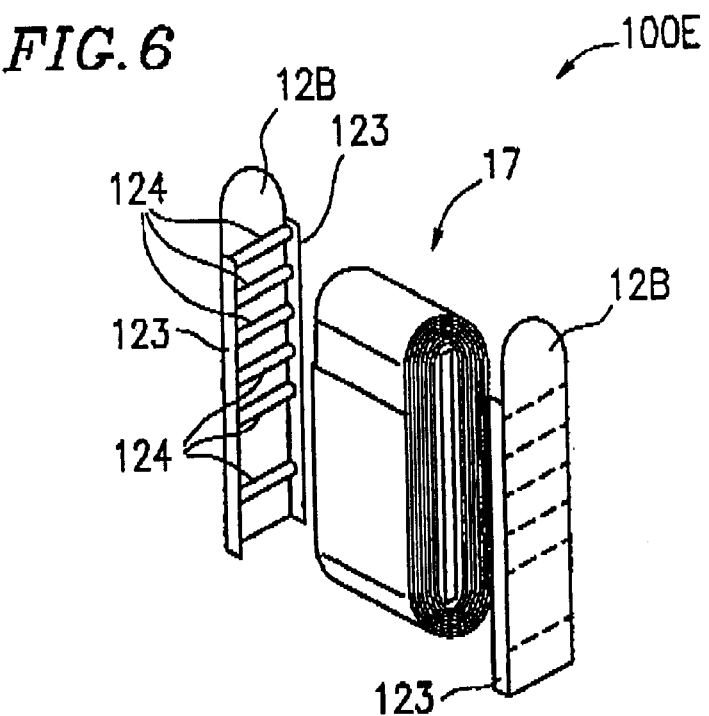
FIG. 6 is an exploded view of a square shaped battery 100E according to embodiment 6 of the present invention.

FIG. 6 is an exploded view of a square shaped battery 100E according to embodiment 6 of the present invention. In FIG. 6, like elements are indicated by like reference numerals used for the square shaped battery 100D of FIG. 5, and detailed descriptions thereof are omitted.

In the square shaped battery 100E according to embodiment 6, a pair of power collectors 12B each have protrusions 124 at welding points thereof so as to secure a larger area for welding than that of Embodiments 1 through 5.

With the protrusions 124 at the welding points, nickel wax is effectively applied to the welding points. Thus, welding efficiency improves since a larger welding area is secured.

Embodiment 7

Figure 7:
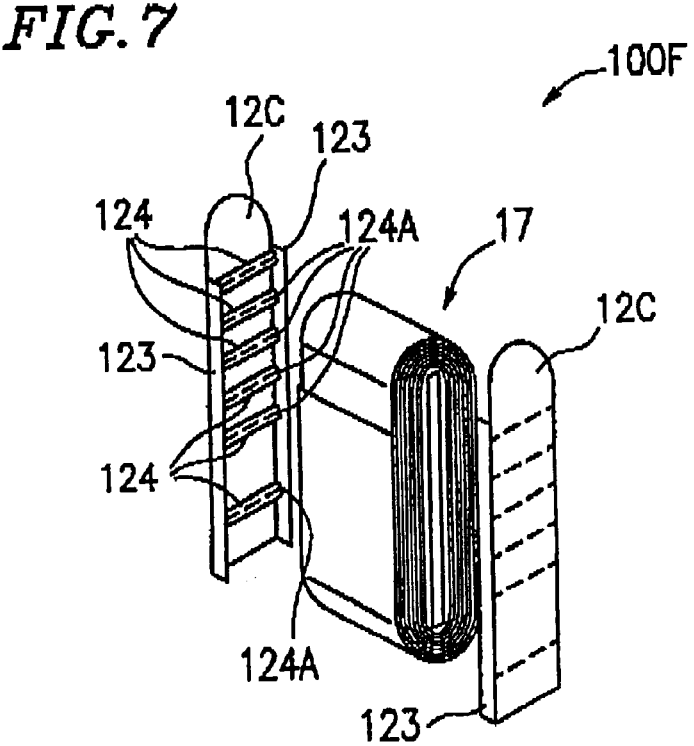
FIG. 7 is an exploded view of a square shaped battery 100F according to embodiment 7 of the present invention.

FIG. 7 Is an exploded view of a square shaped battery 100F according to embodiment 7 of the present invention. In FIG. 7, like elements are indicated by like reference numerals used for the square shaped battery 100E of FIG. 6, and detailed descriptions thereof are omitted.

In the square shaped battery 100F according to embodiment 7, a pair of power collectors 12C each have protrusions 124 at welding points thereof so as to secure a larger area for welding. Each protrusion 124 has a hollow portion 124A.

With the hollow portions 124A of the protrusions 124 located at the welding points, a larger area again to that of Embodiment 6 can be secured for welding, and accordingly, welding efficiency further improves. Furthermore, nickel wax is more effectively applied to the welding points.

Embodiment 8

Figure 8:
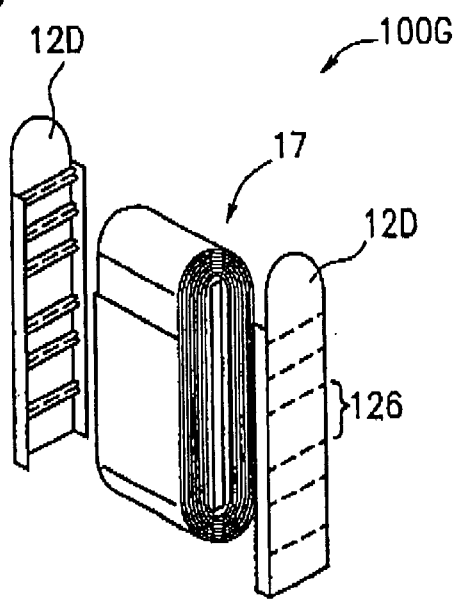
FIG. 8 is an exploded view of a square shaped battery 100G according to embodiment 8 of the present invention.

FIG. 8 is an exploded view of a square shaped battery 100G according to embodiment 8 of the present invention. In FIG. 8, like elements are indicated by like reference numerals used for the square shaped battery 100 of FIGS. 1A and 1B, and detailed descriptions thereof are omitted.

In the square shaped battery 100G according to embodiment 8, a pair of power collectors 12D each have a central portion 126 in which a rib (protrusion) is not provided. While the pair of power collectors 12D are welded to the electrode plate group 17, the central portions 126 are pressed against the electrode plate group 17. With such a structure, even when the electrode plate group 17 is not tightly rolled up, unevenness of welding can be suppressed. As a result, welding efficiency improves.

EXAMPLE

Figure 9:
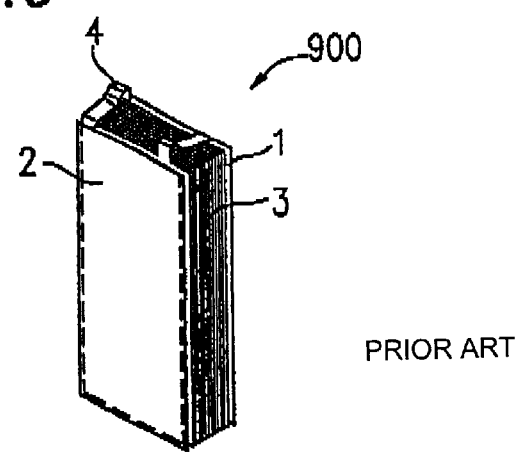
FIG. 9 is a perspective view showing a conventional square shaped battery.
Figure 10:
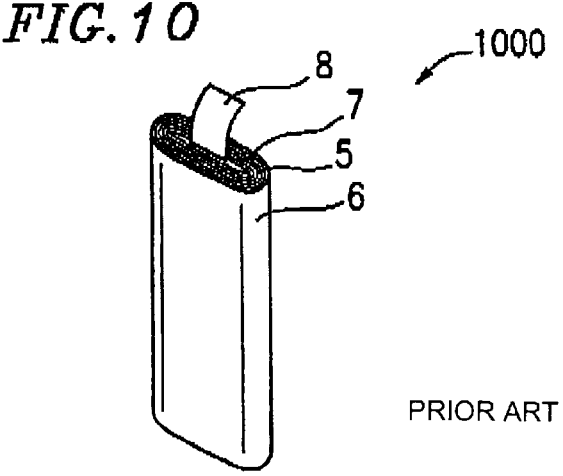
FIG. 10 is a perspective view showing another conventional square shaped battery.

Table 1 shows measurement results of an output characteristic for the square shaped batteries 100, 100A to 100G (Embodiments 1–8), the conventional square shaped battery 900 described with reference to FIG. 9 (Conventional 1), and the conventional square shaped battery 1000 described with reference to FIG. 10 (Conventional 2). For each battery, after SOC had been adjusted to 60%, the battery was subjected to a large current discharge. Based on the result of the large current discharge, a current value with which 10 seconds or more can be secured before a voltage value reaches 1 V was selected, and the selected current value was multiplied by 1 V. The result of the multiplication was obtained as an output characteristic. The unit of the output characteristic is "W". Each value of the output characteristic is an average of 10 samples.

TABLE 1

|  | Output characteristic (W) |
| --- | --- |
| Conventional 1 | 95 |
| Conventional 2 | 100 |
| Embodiment 1 | 120 |
| Embodiment 2 | 140 |
| Embodiment 3 | 130 |
| Embodiment 4 | 130 |
| Embodiment 5 | 135 |
| Embodiment 6 | 140 |

TABLE 1-continued

| | Output characteristic (W) |
|---|---|
| Embodiment 7 | 145 |
| Embodiment 8 | 150 |

As shown in Table 1, the square shaped battery 100 according to embodiment 1 of the present invention can produce electrical power about 20% higher than the conventional square shaped battery 1000 (Conventional 2). This is because the pair of power collectors 12 efficiently collect electric power from the electrode plate group 17 which can produce high electric power.

The square shaped battery 100A according to embodiment 2 of the present invention can produce still higher electrical power. This is because the pair of power collectors collect electric power in opposite directions, and accordingly, electric currents flow smoothly. In the square shaped battery 100A, the pair of power collectors 12 can more efficiently collect electric power from the electrode plate group 17 which can produce high electric power.

The square shaped battery 100B according to embodiment 3 of the present invention can produce electrical power about 10% higher than the square shaped battery 100 according to embodiment 1. This means that power collection efficiency is further increased by increasing the number of power collection points.

The square shaped battery 100C according to embodiment 4 of the present invention can produce electrical power comparable to that produced by the square shaped battery 100B according to embodiment 3. This means that a welding point in the lower portion of the electrode plate group 17 does not greatly contribute to power collection. Accordingly, it is preferable that welding points are concentrated in the upper portions of the power collectors 12.

The output characteristic of the square shaped battery 100D according to embodiment 5 of the present invention is higher than that of the square shaped battery 100C according to embodiment 4 by about 4%. This is because the power collector 12A has bent portions 123 so as to have a "U"-shape which binds the electrode plate group 17. With such a structure, expansion of the sides of the electrode plate group 17 can be suppressed, whereby reliability of power collection is improved.

The output characteristic of the square shaped battery 100E according to embodiment 6 of the present invention is higher than that of the square shaped battery 100D according to embodiment 5 by about 4%. This is because each power collector 12B has protrusions 124 at welding points thereof, and accordingly, nickel wax is effectively applied to the welding points. With such a structure, welding efficiency improves while a larger welding area is secured.

The output characteristic of the square shaped battery 100F according to embodiment 7 of the present invention is higher than that of the square shaped battery 100E according to embodiment 6 by about 4%. This is because each protrusion 124 at a welding point of the power collectors 12 has a hollow portion 124A so that a larger area can be secured for welding, such that welding efficiency is further improved. Furthermore, with the hollow portions 124A, nickel wax can be more effectively applied to the welding points.

The output characteristic of the square shaped battery 100G according to embodiment 8 of the present invention is higher than that of the square shaped battery 100F according to embodiment 7 by about 4%. This is because unevenness of welding can be suppressed even when the electrode plate group 17 is not tightly rolled up, and accordingly, welding efficiency improves.

As described hereinabove, the present invention can provide a high-power square shaped battery.

Further, the present invention can provide a square shaped battery from which electric power can be sufficiently collected.

Furthermore, the present invention can provide a square shaped battery in which an electrochemical reaction resistance can be reduced.

With a structure of a square shaped battery according to the present invention, the facing area of electrode plates can be increased while reducing the number of electrode plates. The higher amount of power produced by the larger facing area can also be efficiently utilized. As a result, a high power battery can be provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A square shaped battery, comprising:

an electrode plate group including a belt-like positive electrode plate, a belt-like negative electrode plate, and a belt-like separator, the belt-like positive electrode plate, the belt-like negative electrode plate, and the belt-like separator being laminated and rolled up to form the electrode plate group; and a pair of power collectors disposed on sides of the electrode plate group for collecting electric power from the electrode plate group, wherein the pair of power collectors are welded sides of the electrode plate group such that the welds are perpendicular to the direction of the electrode plates.

2. A square shaped battery according to claim 1, wherein a welding interval of each of the power collectors is narrower in an upper portion than in a lower portion.

3. A square shaped battery according to claim 1, wherein the pair of power collectors have protrusions for obtaining a sufficient welding area through which the pair of the power collectors are welded to the electrode plate group.

4. A square shaped battery according to claim 3, wherein each of the protrusions has a hollow portion.

5. A square shaped battery according to claim 3, wherein each of a pair of the power collectors has a central portion in which a protrusion is not provided, and the central portion is pressed against the electrode plate group with the power collector being welded to the electrode plate group.

6. A square shaped battery according to claim 1, wherein the pair of power collectors are disposed on both sides of the electrode plate group such that a width direction of the electrode plate group is substantially perpendicular to faces of the pair of power collectors.

7. A square shaped battery according to claim 1, wherein one of the pair of power collectors collects electric power from the electrode plate group in a direction different from that of the other of the pair of power collectors.

8. A square shaped battery comprising:

an electrode plate group including a belt-like positive electrode plate, a belt-like negative electrode plate, and separator, the belt-like positive electrode plate, the belt-like negative electrode plates and the belt-like separator the belt-like positive electrode plate, the belt-like negative electrode plate, and the belt-like separator being laminated and rolled up to form the electrode plate group; and a pair of power collectors disposed around the sides of the electrode plate group for collecting electric power from the electrode plate group, wherein each of the pair of power collectors has a "U"-shape which binds the electrode plate group so as to suppress expansion of the sides of the electrode plate group.

\* \* \* \* \*